3,401,201
IMIDOCARBONATES
Eric Walton, London, England, assignor to Burroughs Wellcome & Co. (U.S.A.) Inc., Tuckahoe, N.Y., a corporation of New York
No Drawing. Filed Aug. 2, 1965, Ser. No. 476,654
Claims priority, application Great Britain, Aug. 5, 1964, 31,828/64
2 Claims. (Cl. 260—566)

ABSTRACT OF THE DISCLOSURE

Compound of the formula

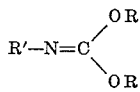

wherein each R is alkyl of 1 to 3 carbon atoms, and wherein R' is selected from the class consisting of aralkyl of 7 to 8 carbon atoms, phenoxy propyl, lower alkoxyalkyl of 3 to 4 carbon atoms, cyclohexyl, alkyl and aralkyl of 7 to 8 carbon atoms substituted with a member selected from the class consisting of methyl, bromo and chloro. The compounds are useful in the preparation of substituted guanidines which are themselves useful in the treatment of hypertension and as anthelmintics.

---

The present invention is an improved method for preparing chemical compounds, and in particular guanidines and acid addition salts thereof.

Guanidines have recently become of increasing interest especially in pharmacology. During the last few years many guanidines have been reported as having a hypoglycaemic action. Moreover, various alkylguanidines have been stated to have a value in the treatment of hypertension.

Prior teachings have shown a group of benzylguanidines, useful in the treatment of hypertension, amongst which are the following:

N-benzyl-N',N''-dimethylguanidine;
N-2-bromobenzylguanidine;
N-2,4-dichlorobenzylguanidine;
N-2-bromobenzyl-N',N''-dimethylguanidine;
N-2-chlorobenzyl-N',N''-dimethylguanidine;
N-2-methylbenzyl-N',N''-dimethylguanidine; and
N-3-methylbenzyl-N',N''-dimethylguanidine.

Prior teachings have also shown a group of 2-thenylguanidines, again useful in the treatment of hypertension, amongst which are the following:

N,N'-dimethyl-N''-2-thenylguanidine; and
N,N'-dimethyl-N''-3-methyl-2-thenylguanidine.

Again, the following guanidines have been reported to be useful in the treatment of hypertension:

2-(3-methylphenoxy)ethylguanidine;
3-phenoxypropylguanidine (J. Pharmacol., 1964, 143, 374);
2-guanidinomethyl - 1,4 - benzodioxan ("guanoxan") British Medical Journal, Feb. 15, 1964, page 398);
{[2-(2,6-dichlorophenoxy)ethyl]amino}-guanidine (British Medical Journal, Feb. 15, 1964, page 402);
N-guanyltetrahydroisoquinoline; and
[2-(octahydro - 1 - azocinyl)ethyl]guanidine ("guanethidine") (United States of America patent specification No. 2,928,829).

Additionally, guanidines have recently become of interest in chemotherapy and many other fields. In prior patents, alkylguanidines such as N-hexadecyl-N',N''-dimethylguanidine are described and claimed as compounds having valuable activities amongst which is a marked anthelmintic activity.

Furthermore, guanidines are of value generally in chemical syntheses. For example, they are used in the syntheses of pyrimidines and other heterocyclic compounds of importance.

The guanidines themselves may be prepared by any of a large number of methods. One of the methods generally adopted comprises reacting an S-substituted isothiourea with ammonia, a primary amine or a secondary amine, while the S-substituted isothiourea starting material may be prepared by reacting the corresponding thiourea with an alkylating agent such as methyl iodide so as to introduce a suitable S-hydrocarbon-substituent.

It has now been found, however, that substituted guanidines can be prepared very readily in a most clean and efficient manner from N-substituted imidocarbonates.

Accordingly, the present invention provides, in one aspect, a process for preparing substituted guanidines, comprising reacting an N-substituted imidocarbonate with ammonia, a primary amine or a secondary amine.

It is to be noted that the term "N-substituted imidocarbonate" as used herein in the claims as well as in the body of the specification embraces (except where otherwise specified) imidothiocarbonates as well as imidocarbonates.

The process of the invention may be conducted in two stages, the defined reaction being the first stage and resulting in the corresponding isourea, which is then itself reacted with ammonia or a primary or secondary amine to form the desired guanidine. For example, the ammonia or amine may be used in the form of the base itself (that is, in the absence of a salt of the base, or, in other words, in the absence of an acid) in which case it has been found generally that the corresponding substituted isourea is formed readily according to the general equation:

(i) 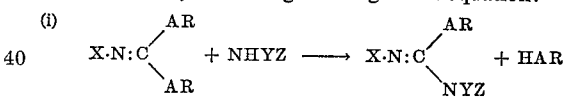

wherein X is a substituent group, each A is an oxygen or sulphur atom, each R is a hydrocarbon substituent group, and Y and Z are each a hydrogen atom or a substituent group. The formed isourea is then reacted with ammonia or a primary or secondary amine in the presence of an acid to form the corresponding substituted guanidine acid addition salt according to the general formula:

(ii) 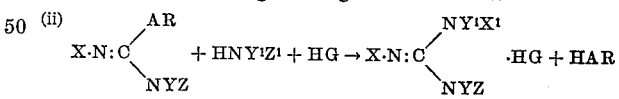

wherein X, A, R, Y and Z are each as defined hereinbefore, $Y^1$ and $Z^1$ are each a hydrogen atom or a substituent group, and HG is an acid. The intermediate isourea need not be isolated, and the acid is conveniently provided by using an acid addition salt of the isourea or base. Moreover, the groups $Y^1$ and $Z^1$ may be different from the groups Y and Z, and it is thereby possible according to the process of the present invention to prepare a guanidine in which each of the three nitrogen atoms in the guanidine moiety bears a different substituent or substituents.

Nevertheless, the process of the invention is advantageously performed in one stage, resulting directly in the desired guanidine. Thus, the process may be performed in the presence of an acid addition salt of the ammonia or amine which is used, in which case the reaction generally produces directly the corresponding guanidine acid addition salt. Indeed it is particularly preferred that there is one molecular equivalent of an acid relative to the N-substituted imidocarbonate present in the reaction mixture, the acid being conveniently introduced in the form of an acid addition salt of the base which is used. It has been found that more than one molecular equivalent tends to cause contamination of the product whilst less than one molecular equivalent results in a reduced yield of product. The reaction under the preferred conditions proceeds without difficulty according to the general equation:

(iii) 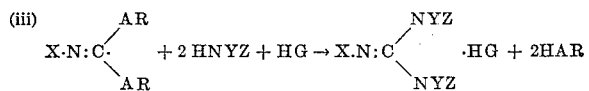

wherein X, A, R, Y, Z and HG are each as defined hereinbefore. Since the N-substituted imidocarbonate may be obtained readily from the corresponding primary amine, $X.NH_2$ according to the symbols given above, it is thus possible by the process of the invention to prepare substituted guanidines from the relatively simple and readily obtainable compounds $X.NH_2$ and NHYZ in as few as two stages.

Moreover, the reactions according to the Equations i and iii above may both be effected under very mild conditions, often without heating, generally below 30° C., normally not below 0° C., for example, at room temperature, conveniently in an aqueous alcoholic solution. They normally proceed to completion under such conditions within a few hours and give satisfactory yields, for example, 85% and above, which are especially useful yields in industrial practice. The process of the present invention therefore provides a particularly valuable route for the synthesis of guanidines.

The ammonia or amine is preferably used in the reactions in the process of the invention in excess of the stoichiometric quantity.

The ammonia may be provided in the reaction mixture in gaseous form or in any other suitable form, for example, as a solution of aqueous/alcoholic ammonia. Also, the ammonium salt for the reactions in Equations ii and iii above is most conveniently provided in a form which is soluble in water and in alcohols, for example, as ammonium acetate.

The primary and secondary amines are preferably alkyl, aryl or aralkyl amines containing in each substituent group not more than twelve, advantageously not more than eight, carbon atoms. Specifically each of the groups Y, Z, $Y^1$, and $Z^1$ in the above equation diagrams (i), (ii) and (iii) may be a methyl, ethyl, allyl, benzyl or phenyl group, as well as a hydrogen atom, this and the first two hydrocarbon groups being especially preferred. Furthermore, the amines may be diamines such as ethylene or propylene diamine. The N-substituted imidocarbonate starting material is desirably a dialkyl N-substituted imidocarbonate in which each alkyl group preferably contains not more than six, and most advantageously only two, carbon atoms. It has been established that, in general, the ethyl N-substitupted imidoracrbonates have a particularly suitable solubility in solvents normally employed in chemical syntheses, especially in water, whereas, for example, in water, the methyl N-substituted imidocarbonates tend to be too soluble and the higher alkyl compounds not sufficiently soluble for really satisfactory yields and operating conditions. However, the N-substituted imidocarbonate starting material may also be any other suitable derivative, for example, an aryl derivative or even an alkylene derivative, that is, a compound containing a grouping such as the divalent ethyleneglycol grouping $O.CH_2.CH_2.O$, in which case the two groups AR in the above equation diagram (iii) will be joined together. Preferably the two groups AR are the same.

It is particularly preferred that the two groups A are both oxygen atoms. The reaction of the invention then occurs without the formation of mercaptans as by-products. These are not only objectionable in themselves, but pose many problems of absorption and disposal. The avoidance of such by-products therefore results in many considerable practical advantages.

The N-substituent X in the imidocarbonate starting material may be any desired grouping and thus, for the preparation of the specific guanidines indicated hereinbefore, may be benzyl, 2 - bromobenzyl, 2,4 - dichlorobenzyl, 2-chlorobenzyl, 2-methylbenzyl, 3-methylbenzyl, 2 - thenyl, 3-methyl-2-thenyl, 2-(3-methylphenoxy)ethyl, 3 - phenoxypropyl, 1,4-benzodioxan-2-methyl, [2-(2,6-dichlorophenoxy)ethyl]amino, tetrahydroisoquinolinyl, 2-(octahydro-1-azocinyl)ethyl or hexadecyl group. Additionally, it has been established specifically, as will be demonstrated in some of the detailed examples given hereinafter, that the substituent group may also be the phenylcarbamoyl, phenylthiocarbamoyl, 2 - ethoxyethyl, 2-methoxyethyl, cyclohexyl, 2-phenylethyl, 2-furfuryl, 4-bromobenzyl, phenyl, allyl or ethoxycarbonylmethyl group. The group X preferably contains a carbon atom directly linked to the nitrogen atom in the imidocarbonate group, and it is most preferably an alkyl group itself optionally substituted with groups such as phenyl, thienyl, furyl, phenoxy, alkoxy and tertiary amino groups. The alkyl group conveniently contains not more than eighteen carbon atoms, and, when substituted, advantageously only one, two or three carbon atoms. It may be a branched chain or a cyclic group as well as a straight chain, and may also be saturated or unsaturated.

As indicated by the equation diagram (iii) above, the process of the invention has been found so far to be particularly valuable for the preparation of N-substituted-N',N''-symmetrical-guanidines, especially the N - alkyl-guanidines listed hereinbefore. Additionally it may be used for the preparation of unsymmetrical guanidines, as indicated by the equation diagram (ii) above, and even N-aminoguanidines, in the last case the starting material being a hydrazidocarbonate. In particular it is applicable to the preparation of N-arylmethyl-N',N''-symmetrical-guanidines such as the benzylguanidines and the 2-thenyl-guanidines which are N',N''-di-lower alkyl substituted. Thus, the particularly preferred amine starting materials are ammonia and primary and secondary alkyl amines in which each alkyl group contains from one to four carbon atoms; specifically preferred alkyl amines ae methylamine, ethylamine, dimethylamine and diethylamine. Moreover, the particularly preferred N-substituted imidocarbonate starting materials are N-alkylimidocarbonates, especially N - aralkylimidocarbonates, such as N-aryl-methylimidocarbonates, for example, N-benzyl- and N-2-thenyl-imidocarbonates. Specifically preferred imidocarbonates, which may be converted by the process of the present invention to the corresponding preferred methyl-guanidines, are:

diethyl N-benzylimidocarbonate;
diethyl N-2-methylbenzylimidocarbonate;
diethyl N-2-bromobenzylimidocarbonate;
diethyl N-2-nitrobenzylimidocarbonate;
diethyl N-2,4-dichlorobenzylimidocarbonate;
diethyl N-3-nitrobenzylimidocarbonate;
diethyl N-3-methylbenzylimidocarbonate;
diethyl N-2-thenylimidocarbonate;
diethyl N-3-methyl-2-thenylimidocarbonate;
dimethyl N-benzylimidocarbonate;
di-n-propyl N-benzylimidocarbonate; and
methyl n-propyl N-benzylimidocarbonate.

Further specifically preferred imidocarbonates, which may be converted to the corresponding guanidines, are:

diethyl N-phenylthiocarbamoylimidocarbonate;
diethyl N-phenylcarbamoylimidocarbonate;
diethyl N-ethoxyethylimidocarbonate;
diethyl N-methoxyethylimidocarbonate;
diethyl N-cyclohexylimidocarbonate;
diethyl N-2-phenylethylimidocarbonate;
diethyl N-2-furfurylimidocarbonate;
diethyl N-4-bromobenzylimidocarbonate;

diethyl N-ethoxycarbonylmethylimidocarbonate;
diethyl N-phenylimidocarbonate; and
diethyl N-allylimidocarbonate.

The products formed by the invention are guanidine acid addition salts, and may be converted into the free base or into other salts by reaction with respectively a base or an acid or salt thereof, for example, in solution or on an ion exchange column. Salts such as sulphates, hydriodides, hydrochlorides, lactates, citrates, tartrates, succinates, oxalates, p-toluenesulphonates and maleates may thus be prepared.

The N-substituted imidocarbonates used as starting materials in the process of the present invention may be prepared by any convenient method useful for preparing imidocarbonates.

Thus, they may be prepared by reacting the corresponding N-substituted isocyandihalide with an alcoholate according to the general equation:

(iv) 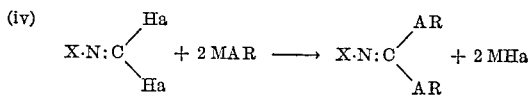

wherein X, both A's and both R's are each as defined hereinbefore, each Ha is a halogen atom, and M is a metal. Desirably, the halogen atoms are both chlorine atoms, or though less favourably, both bromine atoms, whilst the metal is preferably an alkali metal such as sodium or potassium. The alcoholate is preferably formed by reacting an alkali metal and an alcohol, the latter then also serving as a solvent for the reaction mixture. The reaction is particularly applicable to the preparation of imidocarbonates wherein each AR group is an aryloxy or arylthio grouping, for example, a phenoxy group, or wherein the two R groups are not the same, as well as to the preparation of other imidocarbonates. When the two R groups are to be different, the reaction is conveniently effected in two stages, the first desirably under alkaline conditions, at a low temperature and especially in the presence of one molecular equivalent of the alcoholate relative to the isocyandihalide to give a mono-ester, and the second normally in an excess of the alcoholate and at an elevated temperature to obtain the unsymmetrical di-ester.

The N-substituted isocyandihalides are themselves advantageously prepared by a process comprising reacting an N-substituted isothiocyanate with a halogen. Not only does this reaction provide good yields but it also occurs with little or no reaction between the halogen and the N-substituent group, especially if this is an aralkyl group, whilst the sulphur dihalide obtained as a by-product is readily separated from the isocyandihalide. The reaction is desirably effected at or below room temperature, for example, between −20° C. and +30° C., preferably at about 0° C., and is conveniently performed in the presence of a solvent such as carbon tetrachloride. The halogen is preferably provided in the reaction mixture in excess of the stoichiometric quantity.

It is to be noted that certain aralkylisocyandihalides, that is, the starting material in Equation Diagram (iv) wherein X is an aralkyl group, are more fully described and claimed, together with processes for their preparation, as novel compounds of value in chemical syntheses.

The N-substituted imidocarbonates wherein X is a carbamoyl group may also be prepared by reacting an isocyanate with an N-unsubstituted imidocarbonate according to the general equation:

(v) 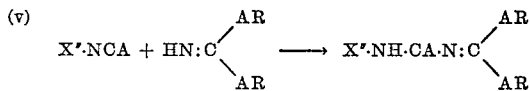

wherein X″ is a substituent group and the three A's and the two R's are each as defined hereinbefore. The reaction occurs very readily at room temperature desirably in ether and with agitation.

The dialkyl N-substituted imidocarbonate starting materials, and especially those wherein each A group is an oxygen atom, used in the process of the present invention may be prepared most conveniently, however, by reacting a salt of a primary amine with an N-unsubstituted imidocarbonate according to the general equation:

(vi) 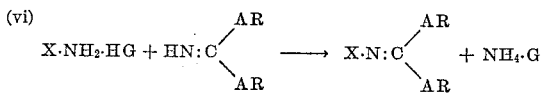

wherein X, both A's, both R's and HG are each as defined hereinbefore. The reaction occurs very readily at room temperature, and thus within a temperature range from −10° C. to +30° C., and is desirably effected in an aqueous or aqueous/alcoholic medium, so that the dialkyl N-substituted imidocarbonate which is produced is precipitated. Advantageously the amine is used in the form of a hydrogen halide.

The dialkyl N-unsubstituted imidocarbonates are themselves preferably prepared by a sequence of reactions comprising (a) treating an alkaline solution of an alkali cyanide and an alcohol with a halogen, and (b) reducing the N-haloimidocarbonate which is thereby formed by reaction with a reducing agent such as an alkali arsenite or sulphite so as to remove the halogen N-substituent. In the first reaction, the alkaline medium is conveniently achieved using sodium hydroxide, the cyanide is desirably sodium or potassium cyanide, the alcohol is, for example, methanol or ethanol, and the halogen is preferably chlorine, less favourably bromine, and is advantageously introduced into the reaction medium until the pH is 8.0; the N-haloimidocarbonate is then formed in very good yields. In the second reaction, the N-haloimidocarbonate is desirably freshly prepared in order to avoid decomposition, the alkali arsenite is most conveniently potassium arsenite and the sulphite the sodium salt, the reaction medium is preferably made alkaline by addition of potassium or sodium hydroxide depending respectively on the nature of the salt used as a reducing agent, and cooling is normally necessary on the large scale; the N-unsubstituted imidocarbonate is then obtained not only in good yields but is generally in a form sufficiently pure for further immediate use.

The N-substituted imidodithiocarbonate starting materials used in the process of the present invention are themselves preferably prepared by reacting an N-substituted dithiocarbamate with an alkyl halide or sulphate according to the general equation:

(vii) 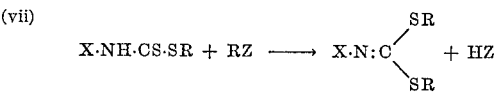

wherein X and both R's are such as defined hereinbefore, and Z is a halogen atom or a sulphate group. The reactant RZ is, for example, methyl or ethyl iodide, and is preferably present in excess of the stoichiometric quantity, whilst the reaction is desirably performed in the absence of a solvent or in an alcoholic medium, such as a methanolic or ethanolic medium, conveniently with warming, for example, on a steam bath.

The present invention extends to substituted guanidines and acid addition salts thereof, whenever prepared in or by a process as herein described.

Moreover, the invention extends to N-substituted imidocarbonates, as novel compounds clearly of value in chemical syntheses, of the general formula:

 (I)

wherein $X^1$ is an alkyl group substituted with an aryl, aryloxy or alkoxy group, and/or cyclised, and/or unsaturated, and each R group is as defined hereinbefore. Desirably, the group $X^1$ is an arylmethyl group, especially a benzyl or 2-thenyl group, or it may also be an allyl, phenylethyl, phenoxypropyl, ethoxyethyl, methoxyethyl, cyclohexyl or furfuryl group, whilst each group R is preferably an alkyl group containing not more than six, advantageously one, two or three carbon atoms. Specifically preferred imidocarbonates of the general Formula I are the N-benzyl- and N-2-thenyl-imidocarbonates listed hereinbefore, especially the diethyl compounds.

Furthermore, the invention also extends to the processes described herein for the preparation of the N-substituted imidocarbonates of the general Formula I, and to the compounds when thus prepared in or by any of the processes herein described.

In order that the invention may be more fully understood, it will now be described, though only by way of illustration, with reference to the following examples, in which all temperatures are in degrees centigrade.

Example 1

A solution of diethyl imidocarbonate (58 g.) (prepared as described by Sandmeyer (Ber., 19, 862)) in water (about 100 ml.) was poured with hand-stirring into an aqueous solution of benzylamine (60 g.) neutralised with hydrochloric acid (total volume about 200 ml.). The resulting oil, which rapidly separated, was extracted with ether, and the extract dried with sodium hydroxide and distilled, when diethyl N-benzylimidocarbonate, B.P. 142°/18 mm., was obtained in good yield.

Diethyl N-benzylimidocarbonate (26 g.), methylamine sulphate (10.5 g.), 33% ethanolic methylamine (80 ml.), and water (20 ml.) were mixed together and mechanically shaken until a homogeneous solution was obtained (about 2 hours). After a further 15 hours at room temperature, the product, now a crystalline mass, was evaporated to dryness, and the residual solid crystallised from methanol/acetone to give N-benzyl-N',N''-dimethyl guanidine sulphate, M.P. 289° with decomposition.

Example 2

A suspension of the benzylamine salt of N-benzyldithiocarbamic acid (29 g.) in ethanol (75 ml.) was treated with methyl iodide (6.5 ml.). The mixture was shaken (for about 5 minutes) to obtain a clear solution, and this, after standing for 30 minutes, was evaporated under reduced pressure to give a semi-solid. The latter was shaken with water (100 ml.) and the resulting emulsion was extracted well with ether. Evaporation of the dried ethereal extract gave methyl N-benzyldithiocarbamate, which, after crystallization from petroleum ether, B.P. 40–60°, melted at 56°.

Methyl N-benzyldithiocarbamate (5.3 g.) with excess of methyl iodide (5 ml.) at 30° for 15 minutes gave an orange-coloured syrup which solidified on cooling and scratching. The methyl iodide-free solid was crystallized from methanol-ether to give dimethyl N-benzylimidodithiocarbonate hydriodide, M.P. 110–114° with decomposition.

A solution of this hydriodide (3 g.) in ethanolic methylamine (30 ml.) was warmed for 3 hours under reflux on the steam bath, when methyl mercaptan was evolved. The product was evaporated under reduced pressure to give solid N-benzyl-N',N''-dimethylguanidine hydriodide, which melted at 189–194° after crystallization from methanol-ether.

Example 3

The intermediate benzyl isocyandichloride used in part (i) below was prepared by the following methods (a) and (b), preferably the latter.

(a) Benzyl isocyanide (5 g.), prepared as described by Malatesta, Gazz. chim. Ital., 77, 238, was dissolved in chloroform (50 ml.), and the solution saturated with dry chlorine at 0°. The product was distilled in vacuo. The fraction, B.P. 110°/15 mm., consisted of benzyl-isocyandichloride.

(b) Benzyl isothiocyanate (40 g.), readily obtained, for example, from the benzylamine salt of benzyl dithiocarbamic acid, was dissolved in carbon tetrachloride, and the solution saturated with chlorine at 0°. The red product was evaporated in vacuum at 100° to remove solvent and sulphur dichloride and the residual straw-coloured oil was distilled. Benzyl isocyanidichloride, B.P. 112–116°/16 mm., was obtained in good yield.

Similarly, the required intermediate, dimethyl N-benzylimidocarbonate, was prepared in two ways, preferably by (ii).

(i) N-benzylisocyandichloride (9.4 g.) was poured slowly into a solution of sodium (8.5 g.) in methanol (200 ml.). The mixture was refluxed for 30 minutes, and then evaporated in vacuo. The residue was treated with water (100 ml.) and extracted with ether. The extract, dried and distilled, gave an oil, B.P. 125–130°/17 mm., consisting of dimethyl N-benzylimidocarbonate.

(ii) A well-stirred solution of sodium cyanide (181 g.) and sodium hydroxide (240 g.) in methanol (350 ml.) and water (1800 ml.) at 0° was freely treated with chlorine gas until the pH value approached 8.0 (about 2½ hours). The resulting white solid, M.P. 20°, consisting largely of dimethyl N-chloroimidocarbonate, was collected, washed with water at 0°, and allowed to melt to an oil, from which a further small quantity of water was removed.

Part of the oil (80 g.) and a 10 N-sodium hydroxide solution (80 ml.) were alternately poured in small portions into a solution of sodium sulphite (105 g.) in water (350 ml.) with vigorous shaking and cooling to maintain the temperature below 40°. The oil went largely into solution. After these additions, a further quantity of solid sodium hydroxide (50 g.) was added with cooling. The mixture was filtered to remove salts (washed with ether) and the filtrate well-extracted with ether. The combined ether extracts, dried over sodium hydroxide on fractional distillation gave dimethyl imidocarbonate, B.P. 111–120°.

A solution of this imidocarbonate (8.9 g.) in water (50 ml.) was treated with benzylamine hydrochloride (14.4 g.) in water (50 ml.). After 15 minutes at room temperature the resulting emulsion was extracted with ether, and the dried extract distilled. The fraction, B.P. 123–125°/16 mm., consisted of dimethyl N-benzylimidocarbonate.

A mixture of dimethyl N-benzylimidocarbonate (1.47 g.), methylamine sulphate (0.66 g.) in water (2.2 ml.), and 33% ethanolic methylamine (12 ml.) was shaken until a clear solution was obtained (about 2 hours). After 18 hours, the resulting solid was collected and crystallised from methanol-acetone to give N-benzyl-N', N''-dimethylguanidine sulphate, M.P. 286–287°.

Example 4

Again, the required intermediate, di-n-propyl N-benzylimidocarbonate, was prepared in two ways:

(i) Benzyl isocyandichloride (10 g.) was poured slowly into a solution of sodium (2.8 g.) in n-propanol (50 ml.) with cooling. The mixture was heated on the steam bath for 1 hour and then evaporated in vacuo. The residue with water (100 ml.) was extracted with ether, and the extract dried and distilled to give di-n-propyl N-benzylimidocarbonate, B.P. 156–160°/15 mm.

(ii) A well-stirred solution of sodium hydroxide (96 g.) and sodium cyanide (72 g.) in n-propanol (260 ml.) and water (1520 ml.) was freely chlorinated at 0° for 1½ hours. The oily layer was well-extracted with ether which, on evaporation, gave a residual oil, consisting of a mixture of di-n-propyl N-chloroimidocarbonate and di-n-propyl imidocarbonate.

Part of this oil (83 g.) was poured into a solution of arsenious oxide (51 g.) and potassium hydroxide (138 g.) in water (550 ml.), and the mixture well shaken at 45° for 1 hour. Fractionation of the dried ether extract gave di-n-propyl imidocarbonate, as an oil, B.P. 79–82°/17 mm., only moderately soluble in water.

An emulsion of di-n-propyl imidocarbonate (6.45 g.) in water (380 ml.) was treated with benzylamine hydrochloride (7.17 g.) in water (25 ml.). The mixture, after 30 minutes at 100°, was extracted with ether, and the extract dried and distilled to give di-n-propyl N-benzyl imidocarbonate, B.P. 160–162°/16 mm.

A mixture of this imidocarbonate (1.2 g.), methylamine sulphate (0.4 g.), water (3 ml.) and 33% ethanolic methylamine (10 ml.) was shaken from time to time over a period of 3 days. The resulting white solid was collected and twice crystallised from methanol-acetone to give N-benzyl-N',N''-dimethylguanidine sulphate, M.P. 275–280°.

Example 5

Benzylisocyandichloride (36 g.) in ether (200 ml.) was added to a solution of sodium (6 g.) in methanol (130 ml.) at 0°. The sodium chloride which was formed was removed and the filtrate evaporated in vacuo at room temperature. The residue was treated with water (200 ml.) and extracted with ether. Fractional distillation of the dried extract gave methyl-N-benzylchloroformimidate, B.P. 118–120°/15 mm.

The latter (9.2 g.) in ether (50 ml.) was added to a solution of sodium (2.3 g.) in n-propanol (100 ml.). The mixture, which became warm, was heated at 70–80° for one hour and evaporated in vacuo; the resulting paste was treated with water (200 ml.). Extraction with ether and fractionation afforded an oil, B.P. 135–138°/15 mm., consisting of methyl - n - propyl N-benzylimidocarbonate. This N-benzylimidocarbonate (2.1 g.), methylamine sulphate (0.8 g.), 33% ethanolic methylamine (15 ml.) and water (3 ml.) were shaken together for 3 hours and the solution left at room temperature a further 18 hours. Vacuum evaporation afforded a solid, which crystallised from methanol-acetone to give N-benzyl-N',N''-dimethylguanidine sulphate, M.P. 285–290°.

Example 6

Diethyl N-benzylimidocarbonate (2.1 g.), ammonium acetate (0.7 g.) and strong ethanolic ammonia (15 ml.) were heated in a Carius tube at 100° for about 2 hours. Removal of the ethanol and ammonia left a syrup which crystallised from methanol-ether to give benzyl-guanidine acetate, M.P. 145–148°. With strong sodium hydroxide it gave benzylguanidine, M.P. 54–58°, which formed a sulphate, M.P. 203°.

Example 7

Phenyl isocyanate (8 g.) in ether (25 ml.) was poured slowly, with shaking, into diethyl imidocarbonate (12 g.) in ether (25 ml.). The solid product was collected and crystallised from benzene-light petroleum, B.P. 60–80°, to give diethyl N-phenylcarbamoylimidocarbonate, M.P. 102–106°.

A mixture of this imidocarbonate (2.6 g.), methylamine sulphate (0.8 g.) and 33% ethanolic methylamine (15 ml.) was left at room temperature for 12 days. Evaporation in vacuo left a gum, which was acidified with 5 N-HCl to give long needles of a hydrated hydrochloride, M.P. ca. 100°. Drying by evaporation with ethanol, and crystallisation from methanol-ether, gave flocculent crystals, M.P. with decomposition 193–196°, consisting of N,N'-dimethyl-N''-phenylcarbamoylguanidine hydrochloride.

Example 8

Diethyl N-benzyl imidocarbonate (4 g.), 33% ethanolic ethylamine (13.8 ml.) and ethylamine sulphate (1.73 g.), in water (3.5 ml.), were shaken together until homogeneous (about 4 hours). After 15 hours, the solution was evaporated to give N - benzyl - N',N'' - diethylguanidine sulphate, which, after crystallisation from ethanol-ether, melted at 226–228°.

Example 9

Diethyl N-benzyl imidocarbonate (4 g.), 33% ethanolic dimethylamine (14 ml.) and dimethylamine sulphate (ca. 1.8 g.), in water (3.6 ml.), were shaken together for 4 hours, left 16 hours, and then heated at 100° under reflux for a further 5 hours. Evaporation afforded a residue, which was dissolved in water and washed with ether. The aqueous solution was strongly basified with sodium hydroxide and extracted with ether. The extract, on evaporation, afforded crude N-benzyl-N',N''-tetramethylguanidine, which gave a picrate, M.P. 100–110° (ex n-propanol).

Example 10

A mixture of diethyl N-benzylimidocarbonate (4 g.), benzylamine (7.6 g.), benzylamine sulphate (2.6 g.), water (9 ml.) and ethanol (22.5 ml.) was shaken at room temperature until homogeneous (about 4 hours). After a further 16 hours the product was evaporated in vacuo, and the residue crystallised from water to give N,N',N''-tribenzylguanidine sulphate, M.P. 246–251°.

Example 11

A solution of 2-phenylethylamine hydrochloride (11.3 g.) in water (45 ml.) was treated with diethyl imidocarbonate (8.1 g.) in water (45 ml.). The oil which rapidly separated was extracted with ether and distilled to give diethyl N-2-phenylethylimidocarbonate, B.P. 144–147°/17 mm.

A mixture of this imidocarbonate (4 g.), 33% ethanolic methylamine (11 ml.) and methylamine sulphate (1.38 g.) in water (2.7 ml.) was shaken together for about 2½ hours. After 16 hours the solution was evaporated in vacuo, and the residue dissolved in a little water and basified with sodium hydroxide. The ethereal extract gave an oil which, with dilute hydriodic acid, formed sparingly-soluble N,N'-dimethyl-N''-2-phenylethylguanidine hydriodide. Recrystallised from ethanol-ether, it melted at 156–159°.

Example 12

A solution of p-bromobenzylamine hydrochloride (15.4 g.) in water (200 ml.) was treated with diethyl imidocarbonate (7.7 g.) in water (10 ml.). The oil, which separated immediately, was extracted with ether, and distilled to give diethyl N - 4 - bromobenzylimidocarbonate, B.P. 173–176°/15 mm.

A mixture of diethyl N-4-bromobenzylimidocarbonate (4 g.), 33% ethanolic methylamine (8.5 ml.) and methylamine sulphate (1.1 g.) in water (2 ml.) was shaken until homogeneous (about 1 hour), left 16 hours at room temperature and then evaporated to give a solid which, after two crystallisations from methanol-acetone, gave N-4-bromobenzyl - N',N'' - dimethylguanidine sulphate, M.P. 281–283°.

Example 13

A solution of diethyl N-4-bromobenzylimidocarbonate (4 g.), benzylamine (6 ml.) and benzylamine sulphate (2.1 g.) in ethanol (18 ml.) and water (6 ml.) was left at room temperature for 16 hours. After evaporation, the residue was washed with methanol-ether and then crystallised successively from water and methanol-ether to give N,N' - dibenzyl - N'' - 4 - bromobenzylguanidine sulphate, M.P. 247–248°. The hydrochloride melts at 198–200°.

Example 14

2-furfurylamine hydrochloride (12.6 g.) in water (56 ml.) was treated with diethyl imidocarbonate (10.52 g.) in water (56 ml.). The resultant oil was extracted with ether and distilled to give diethyl N-2-furfurylimidocarbonate, B.P. 116–119°/17 mm.

A mixture of this imidocarbonate (4 g.) in 33% ethanolic methylamine (12.5 ml.) and methylamine sulphate (1.53 g.) in water (3 ml.) was shaken for 3 hours and left for 16 hours. The mixture was then again shaken to achieve homogeneity and left a further 6 hours. The residue obtained by evaporation was strongly basified, and the oily base extracted with ether and converted to N-2-furfuryl - N',N''-dimethylguanidine hydriodide, which after successive crystallisations from ethanol-ether and n-propanol melted at 151–150°.

Example 15

Diethyl N-2-furfurylimidocarbonate (4 g.) in 33% ethanolic ethylamine (15.8 ml.) and ethylamine sulphate (2 g.) in water (4 ml.) were shaken together until homogeneous (about 3 hours). After a further 60 hours at room temperature the solution was evaporated to give a solid, which, after two crystallisations from ethanol-ether, afford N,N''-diethyl-N''-2-furfurylguanidine sulphate, M.P. 191–195°.

Example 16

A solution of diethyl N-2-furfurylimidocarbonate (4 g.) and allylamine sulphate (2.2 g.) in allylamine (7.5 ml.), ethanol (15 ml.) and water (4 ml.), after standing 16 hours at room temperature, was evaporated to dryness. The residue, after two crystallisations from ethanol, gave N,N''-diallyl-N''-2-furfurylguanidine sulphate, M.P. 212–213°. The hydriodide from ethanol-ether melted at 96–100°.

Example 17

A solution of 2-thenylamine hydrochloride (8.0 g.) in water (32 ml.) was treated with a solution of diethyl imidocarbonate (6.0 g.) in water (32 ml.) at room temperature. The resulting oil was extracted with ether and distilled to give diethyl N-2-thenylimidocarbonate, B.P. 147–149°/20 mm.

A mixture of this imidocarbonate (4 g.) in 33% ethanolic ethylamine (14 ml.) and ethylamine sulphate (1.76 g.) in water (3.5 ml.) was shaken until homogeneous (about 2½ hours). After 16 hours at room temperature the solution was evaporated to dryness in vacuo, and the resulting solid crystallised successively from methanol-acetone and ethanol-ether to yeild N,N'-diethyl-N''-2-thenylguanidine sulphate, M.P. 196–199°.

Example 18

Diethyl N-2-thenylimidocarbonate (2 g.) methylamine sulphate (0.75 g.), 33% ethanolic methylamine (6 ml.) and water (1.5 ml.) were shaken for 5 hours, then left at room temperature for a further 16 hours. The product (partly crystalline) was evaporated and the residue crystallised from methanol-acetone to give N'N'-dimethyl-N''-2-thenylguanidine sulphate, M.P. 271–273°.

Example 19

A solution of cyclohexylamine hydrochloride (9.5 g.) in water (25 ml.) was mixed with a solution of diethyl imidocarbonate (8.2 g.) in water (25 ml.). The oil, which separated, was extracted with ether and distilled to give diethyl N-cyclohexylimidocarbonate, B.P. 107–109°/12 mm.

A mixture of this imidocarbonate (4 g.) and ethylamine sulphate (1.6 g.) in 33% ethanolic ethylamine (12 ml.) and water (3 ml.) was shaken until homogeneous (2½ hours). After 60 hours at room temperature, the product was evaporated to yield an amorphous mass, which was dissolved in a little water. The clarified solution was treated with potassium iodide, causing the separation of a gummy hydriodide. This was collected and eventually solidified by grinding with water, to afford N-cyclohexyl-N',N''-diethyl-guanidine hydriodide, M.P. 118–122°.

Example 20

Diethyl N-cyclohexylimidocarbonate (1 g.) in 33% ethanolic methylamine (3 ml.) and methylamine sulphate (0.38 g.) in water (0.8 ml.) were shaken together until homogeneous (3 hours). After 16 hours the solution was evaporated to dryness and the residue basified with sodium hydroxide solution. The oil which separated was extracted with ether and converted to the hydriodide in the usual way. This salt, on crystallisation from ethanol-ether, gave N-cyclohexyl-N',N''-dimethylguanidine hydriodide, M.P. 190–194°.

Example 21

The layer of oil that separated on mixing allylamine hydrochloride (6.6 g.) in water (32 ml.) and diethyl imidocarbonate (8.3 g.) in water (32 ml.) was extracted with ether and distilled to give diethyl N-allylimidocarbonate, B.P. 62–64°/10 mm.

A mixture of this imidocarbonate (2 g.) in 33% ethanolic methylamine (8 ml.) and methylamine sulphate (1.02 g.) in water (2 ml.) was shaken until homogeneous and then left 16 hours at room temperature. Evaporation yielded a solid, which crystallised from methanol-acetone to give N-allyl-N',N''-dimethylguanidine sulphate, M.P. 287–290°.

Example 22

A solution of diethyl N-allylimidocarbonate (2 g.) and allylamine sulphate (1.35 g.) in allylamine (4.7 ml.), ethanol (9.5 ml.) and water (2.7 ml.), after standing 16 hours at room temperature, deposited a solid which was collected and crystallised from methanol-acetone. It gave N,N',N''-triallylguanidine sulphate, M.P. 237–238°.

Example 23

A solution of aniline hydrochloride (4.5 g.) in water (25 ml.), mixed with a solution of diethyl imidocarbonate (4.1 g.) in water (25 ml.), gave an oil which, on extraction and distillation, afforded diethyl N-phenylimidocarbonate, B.P. 126–130°/15 mm.

A mixture of this imidocarbonate (2.9 g.), methylamine sulphate (1.2 g.), 33% ethanolic methylamine (10 ml.) and water (2.4 ml.) was kept for 60 hours, with intermittent shaking (ca. 10 hours), then heated to 100° for 2 hours and then left at room temperature for a further 16 hours. Evaporation gave a residue which was basified and extracted with ether. The N,N'-dimethyl-N'' phenylguanidine thus extracted was crystallised from benzene-light petroleum (B.P. 60–80°) and had M.P. 104–109°. The hydriodide, from ethanol-ether, melted at 212–215°.

Example 24

2-methoxy-ethylamine hydrochloride (10.7 g. deliquescent) in water (30 ml.) was treated with diethyl imidocarbonate (11 g.) in water (30 ml.) to produce an oil which, on extraction with ether, and distillation gave diethyl N-2-methoxyethylimidocarbonate, B.P. 83–85°/15 mm.

A mixture of this imidocarbonate (4.4 g.) in 33% ethanolic methylamine (16 ml.) and methylamine sulphate (1.72 g.) in water (4 ml.) was shaken until homogeneous (2 hours), then left 60 hours at room temperature. Evaporation gave a residue which was well extracted with ethanol. The ethanolic extract was treated fractionally with ether to give early crops of crystalline material, recrystallisation of which, from methanol-ether, gave N - 2 - methoxyethyl-N',N''-dimethylguanidine sulphate, M.P. 220–224°.

Example 25

2-ethoxy-ethylamine hydrochloride (4 g.) in water (10 ml.), treated with diethyl imidocarbonate (3.7 g.) in water (10 ml.) gave an oil which was extracted and distilled to furnish diethyl N-2-ethoxyethylimidocarbonate, B.P. 98°/17 mm.

A mixture of this imidocarbonate (1 g.) in 33% ethanolic methylamine (4 ml.) and methylamine sulphate (0.42 g.) in water (1 ml.) was shaken until homogeneous (2 hours) and left 16 hours. After evaporation the residual solid was fractionally crystallised from ethanol-ether to give a second crop, M.P. 198–200°, consisting of N-2-ethoxyethyl-N',N''-dimethylguanidine sulphate.

Example 26

A mixture of diethyl N-ethoxycarbonylmethylimidocarbonate, B.P. 120–124°/20 mm. (7.6 g.), methylamine sulphate (3 g.) in water (8.5 ml.) and 33% ethanolic methylamine (34 ml.) was shaken for 2 hours, more alcohol (20 ml.) was added, and the mixture was left at room temperature for 60 hours. The solid which separated was collected and boiled with ethanol to remove insoluble methylamine sulphate. The filtrate yielded a crop of N-carboxymethyl-N',N''-dimethylguanidine, M.P. 136–140°.

Neutralisation of this guanidine with hydrochloric acid, and evaporation to dryness, gave (by ring closure) 1-methyl-2-methylaminoimidazoline - 4 - one hydrochloride, M.P. 280–284° (ex ethanol).

Example 27

Diethyl N-benzylimidocarbonate (5 g.) was treated with a limited amount of ethylenediamine (1.6 ml.) in ethanol (15 ml.) and ethylenediamine dihydrochloride (2.35 g.) in water (5 ml.). Spontaneous warming occurred. After 1 hour at 100°, the product was evaporated to dryness in vacuo, and the residue dissolved in water and filtered to remove a trace of solid. The filtrate was neutralised with dilute hydrochloric acid, again evaporated to dryness, and the residue fractionally crystallised from methanol and methanol-ether. Early high-melting crops were rejected, but that melting at 140–180° was recrystallised from ethanol-acetone to give 2-benzylamino-2-imidazoline hydrochloride, M.P. 186–190°. The hydriodide, from acetone-ether, melted at 146–147°.

Example 28

Diethyl N-benzylimidocarbonate (4 g.), allylamine (7.25 ml.), ethanol (14 ml.), allylamine sulphate (2.05 g.) and water (4 ml.) were mixed, and the resulting solution left to stand at room temperature for 3 days. The solid which separated was crystallised successively from methanol-acetone and ethanol to give N,N'-diallyl-N''-benzylguanidine sulphate, M.P. 200–202°.

Example 29

A toluene solution of diethyl N-chloroimidocarbonate was stirred very vigorously with an aqueous solution of sodium sulphite (containing sodium hydroxide) so as to obtain thorough mixing of the two phases. The reaction was complete within 2–3 hours at a reaction temperature between 20° and 25°, and the toluene layer was then separated, and the solution assayed and used without further treatment in the preparation of diethyl N-benzylimidocarbonate.

An aqueous solution of benzylamine was neutralised with aqueous hydrochloric acid solution, and the resulting solution stirred very vigorously with the toluene solution of diethyl imidocarbonate at room temperature for about 3 hours. The toluene layer (containing crude diethyl N-benzylimidocarbonate) was washed with water, the toluene and water removed by distillation, and the crude residue used without further purification in the preparation of N-benzyl-N',N''-dimethyl guanidine sulphate.

The suspension obtained by mixing an aqueous solution of monomethylamine sulphate, an aqueous monomethylamine solution, ethyl alcohol and crude diethyl N-benzylimidocarbonate, was mechanically stirred at room temperature until miscibility was attained (1–2 hours). The solution was then left unstirred at room temperature for a further period of 15–24 hours. After removal of excess amine, water and alcohol by distillation, the product was isolated and purified.

Example 30

A solution of diethyl N-benzylimidocarbonate (3 g.) in 33% ethanolic methylamine was allowed to stand for 18 hours at room temperature and then evaporated in vacuo. The residue was neutralised with dilute hydriodic acid, the solution again evaporated, and the residue crystallised from n-propanol-ether to give N-benzyl-O-ethyl-N'-methylisourea hydriodide, M.P. 93–95°.

The isourea derived from this hydriodide was carefully neutralised with 2 N-sulphuric acid, the clear neutral solution washed with ether or toluene, and the ether or toluene-free aqueous solution of N-benzyl-O-ethyl-N' methylisourea sulphate used in the succeeding stage of the synthesis.

The solution was treated with 33% ethanolic methylamine (160 ml.) or 40% aqueous methylamine together with sufficient ethanol for miscibility, and, after occasional shaking to effect a clear solution, was allowed to stand at room temperature for eighteen hours (overnight). It was then evaporated to dryness under reduced pressure, and the residual white solid crystallised from methanol - acetone to give N - benzyl - N',N''-dimethylguanidine sulphate.

Example 31

Diethyl-N-benzylimidocarbonate (3 g.) and strong ethanolic ammonia (15 ml.) were heated together in a sealed tube at 100° for 3 hours. After evaporation, the residue was crystallised from light petroleum (B.P. 60–80°) to give N-benzyl-O-ethyl-isourea, M.P. 64–69°. The sulphate melts at 133–135° and the hydriodide at 80–82°. By essentially the same procedure as that described in Example 30, the isourea was converted to benzylguanidine sulphate.

Example 32

Diethyl phenylcarbamoylimidocarbonate (1 g.) was treated with strong ethanolic ammonia (10 ml.). After 1 minute the product was evaporated to yield a solid, which was crystallised from light petroleum (B.P. 60–80°) to give O-ethyl-N-phenylcarbamoylisourea, M.P. 86–89°. This was converted to N-phenylcarbamoylguanidine sulphate by essentially the procedure described in Example 30.

Example 33

Diethyl phenylcarbamoylimidocarbonate (4.7 g.) was treated with 33% ethanolic methylamine (15 ml.); some heat was produced. After 3 hours at 45° in a sealed tube, the produce was evaporated to a syrup, which, with dilute hydrochloric acid, gave a solid, crystallisable from water in hair-like needles. The bulk of the solid was, however, crystallised from ethanol-ether to give O-ethyl-N-methyl-N'-phenylcarbamoylisourea hydrochloride in the form of tablets, M.P. 113–115°, with decomposition. The base, from light petroleum (B.P. 60–80°), melts at 81–83°. It was converted to N,N'-dimethyl-N''-phenylcarbamoylguanidine sulphate by essentially the procedure described in Example 30.

Example 34

Diethyl phenylthiocarbamoylimidocarbonate (2.5 g.) was treated with 33% ethanolic methylamine. There was rapid solution, followed by separation of crystals, which were collected and crystallised from light petroleum (B.P. 60–80°) to afford O-ethyl-N-methyl-N'-phenylthiocarbamoylisourea, M.P. 114–117°. This was converted to N,N' - dimethyl - N''-phenylthiocarbamoylguanidine sulphate by essentially the procedure described in Example 30.

I claim:

1. A compound of the formula

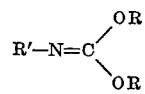

wherein each R is alkyl of 1 to 3 carbon atoms, and wherein R' is selected from the class consisting of aralkyl of 7 to 8 carbon atoms, phenoxypropyl, lower alkoxyalkyl of 3 to 4 carbon atoms, cyclohexyl, alkyl and aralkyl of 7 to 8 carbon atoms substituted with a member selected from the class consisting of methyl, bromo and chloro.

2. A compound of the formula of claim 1, wherein R' is benzyl.

References Cited

UNITED STATES PATENTS 3,189,599  6/1965  Mull.
3,248,426  4/1966  Dvornik _____ 260—564

FOREIGN PATENTS 226,239  3/1963  Austria.

OTHER REFERENCES

Drozdov et al., "Chemical Abstracts," vol. 39, pp. 3784–5 (1945).

CHARLES B. PARKER, *Primary Examiner.*

ROBERT V. HINES, *Assistant Examiner.*